United States Patent
Sherman

Patent Number: 5,404,087
Date of Patent: Apr. 4, 1995

[54] AUTOMATED GUIDED VEHICLE WIRE GUIDANCE APPARATUS

[76] Inventor: Leigh E. Sherman, 232 Yankee Rd. #94, Quakertown, Pa. 18951

[21] Appl. No.: 25,700

[22] Filed: Mar. 3, 1993

[51] Int. Cl.$^6$ ............................................. G05D 1/00
[52] U.S. Cl. ................................... 318/587; 180/168; 364/424.01
[58] Field of Search ..................... 318/580, 587; 180/167-169; 364/424.01, 424.02, 443

[56] References Cited

U.S. PATENT DOCUMENTS

| | | | |
|---|---|---|---|
| 4,307,329 | 12/1981 | Taylor | 318/587 |
| 4,310,789 | 1/1982 | Mank et al. | 318/587 |
| 4,524,314 | 6/1985 | Walker | 318/587 |
| 4,530,056 | 7/1985 | Mackinnon et al. | 318/587 X |
| 4,729,449 | 3/1988 | Holmquist | 180/168 |
| 4,820,961 | 4/1989 | McMullin | 318/587 |
| 5,000,279 | 3/1991 | Kondo et al. | 180/168 |
| 5,068,791 | 11/1991 | Klopfleisch et al. | 180/169 X |
| 5,136,225 | 8/1992 | Heddebaut et al. | 318/587 |

FOREIGN PATENT DOCUMENTS

| | | |
|---|---|---|
| 2648105 | 10/1976 | Denmark . |
| 055304 | 7/1982 | European Pat. Off. . |
| 2080576 | 2/1982 | United Kingdom . |
| 2095350 | 9/1982 | United Kingdom . |
| 2104686 | 3/1983 | United Kingdom . |

*Primary Examiner*—Jonathan Wysocki

[57] ABSTRACT

A wire guidance apparatus for an automated guided vehicle which comprises a first crossed coil sensor for acquiring a wire and tracking along curves in the wire as the vehicle is travelling in the forward direction, a second crossed coil sensor for acquiring the wire and tracking along the wire when the vehicle is travelling in the reverse direction, third and fourth sensors for tracking along straight runs in the wire and circuitry for switching between the crossed coil sensors and the third and fourth sensors. Circuitry is also provided to generate a guidance error signal from the outputs of either of the crossed coil sensors or both the third and fourth sensors. The guidance error signal is then used to control a motor connected to a steerable wheel of the vehicle to maintain the vehicle in alignment with the wire.

8 Claims, 4 Drawing Sheets

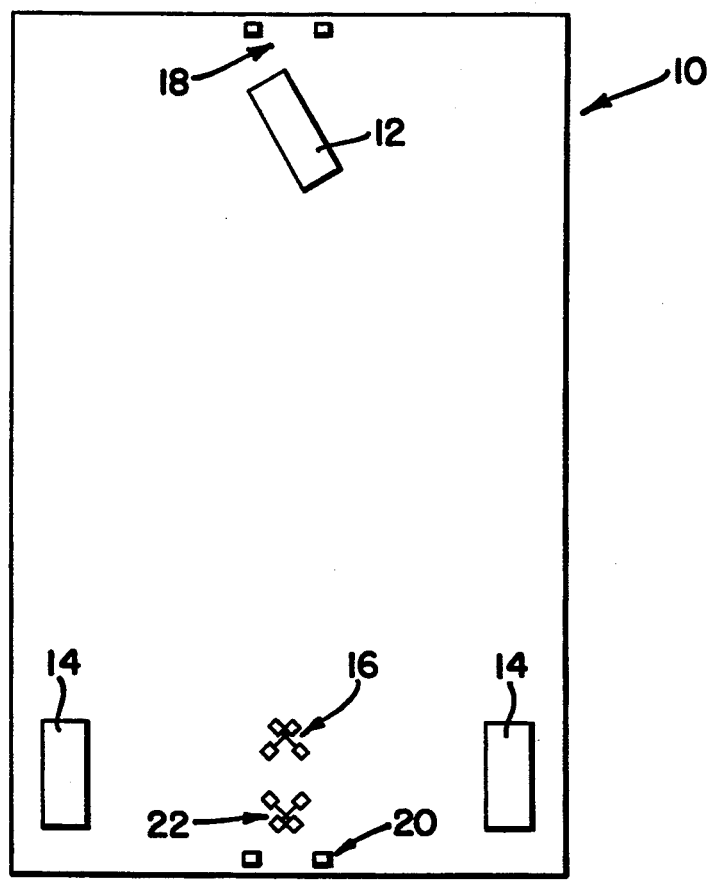
FIG_1
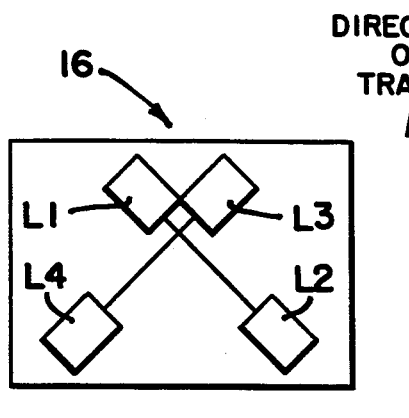
FIG_2
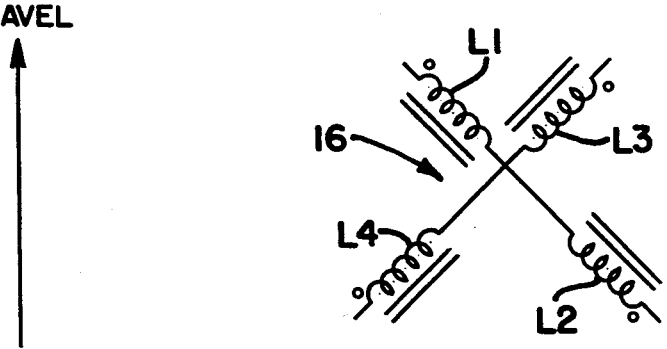
FIG_2A

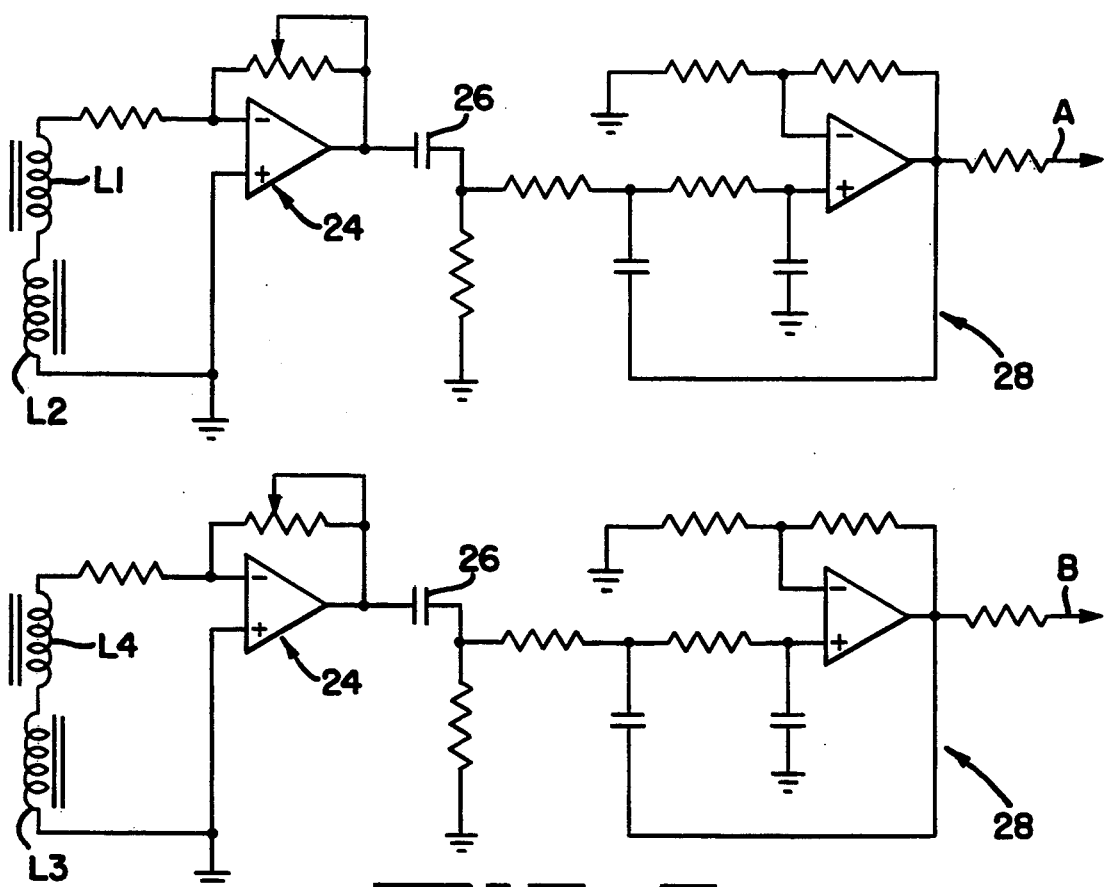
FIG_3
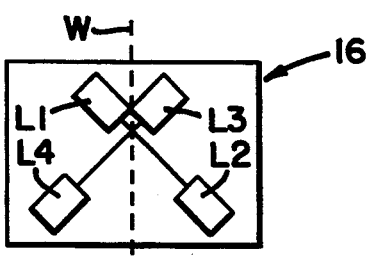
FIG_4A
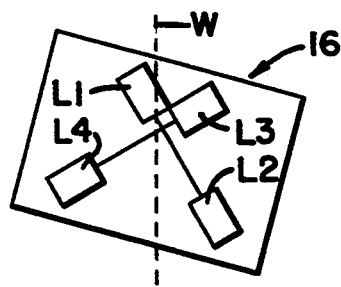
FIG_4B
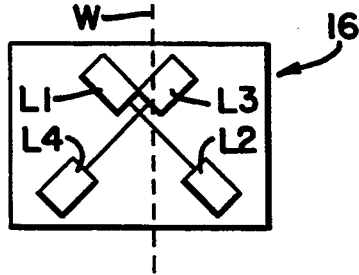
FIG_4C
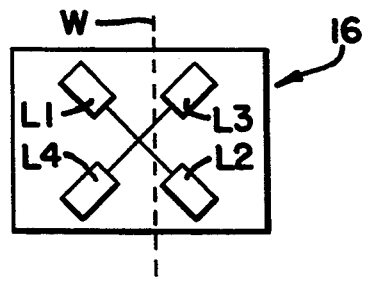
FIG_4D

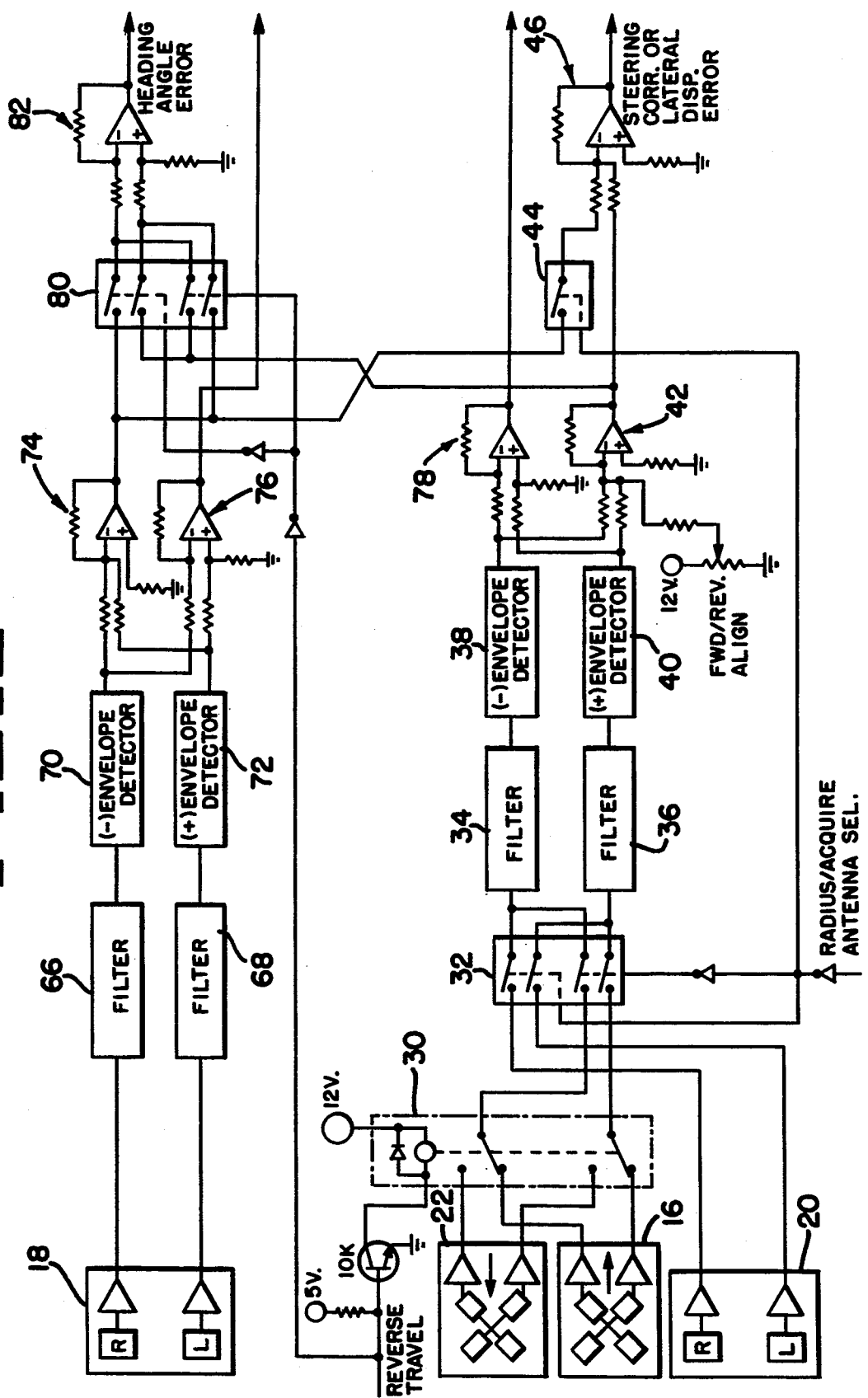

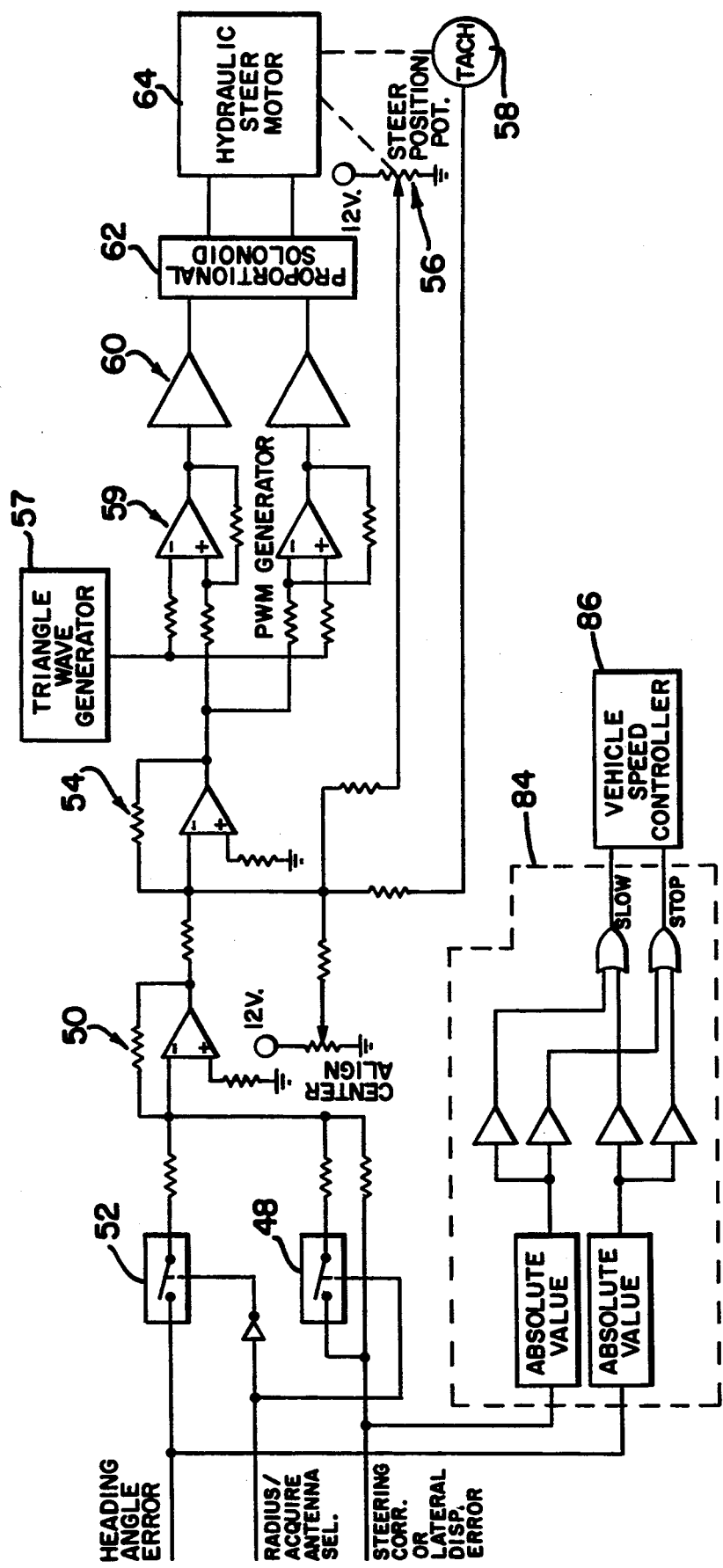
FIG_6

AUTOMATED GUIDED VEHICLE WIRE GUIDANCE APPARATUS

BACKGROUND OF THE INVENTION

1. Field of the Invention

This invention relates to automated guided vehicles and, more particularly, to automated guided vehicles that comprise sensors or antenna coils for guiding the vehicles along a wire imbedded in a floor.

2. Description of Related Art

Automated guided vehicles which utilize guide wire navigation are known in the art. One example of such a vehicle is an automated lift truck, which typically operates along narrow aisles between, e.g., shelves in a warehouse. These vehicles comprise sensors or antenna coils which respond to magnetic fields generated by guide wires imbedded in the floor along a predetermined path. The voltages induced in the coils are representative of the lateral displacement error, or lateral distance from the wire to the centerline of the coils, and the heading angle error, or the angle between the wire and the centerline of the coils. The induced voltages are used to generate a steering correction error signal, which in turn is used to control a motor or similar mechanism which can turn the steerable wheel to maintain the coils, and therefore the vehicle, aligned with the wire as the vehicle is moving. Thus, the coils provide a means by which the vehicle can track along the wire and thereby stay within a predefined path. Typically, an operator is required to align the vehicle over the wire, although some automated guided vehicles are capable of acquiring the wire, or aligning the coils with the wire, to some degree once the vehicle is placed over the wire.

Examples of such automated guided vehicles are disclosed in U.S. Pat. No. 4,307,329, issued to Taylor, and U.S. Pat. No. 4,310,789, issued to Mank et al. These patents recognize that, to achieve close tracking at high speeds, the coils should provide a steering correction signal that is much more responsive to the heading angle error than to the lateral displacement error. This is due to the fact that lateral displacement error increases relative to the time integral of the vehicle velocity multiplied by the heading error. The patents also recognize that disruptions in the magnetic field created by floor anomalies, such as reinforcing bars or expansion joints, cause changes in the voltages induced in the coils that can cause tracking errors. Taylor employs two coil pairs and associated circuitry to generate a steering correction error signal that corresponds to a desired ratio of heading error to displacement error that will provide relatively good tracking along a straight wire. The coils in each pair are spaced 9.5 inches apart and the pairs are spaced 16 inches apart. This spacing is selected as a compromise that would best allow the vehicle to acquire the wire and track along a straight wire. However, Taylor's vehicle cannot track along a curve in the wire and may have problems acquiring the wire if the initial angle between the centerline of the coils and the wire is too great. In addition, the coils are so far apart that floor anomalies may cause tracking errors. While Mank et al. teaches using a third set of coils to determine the radius of a curve in the wire and thereby track along the curve, their vehicle may still be subject to tracking errors caused by floor anomalies and may have problems acquiring the wire when the initial angle is too great.

SUMMARY OF THE INVENTION

Therefore, it is an object of the present invention to provide an automated guided vehicle with a wire guidance apparatus which can acquire a guide wire at relatively great angles, track along straight runs of the wire at high speeds and with great accuracy, and track along a curve in the wire. It is another object of the invention to provide such a vehicle with a wire guidance apparatus that is relatively immune to floor anomalies.

According to the present invention, these and other objects and advantages are achieved by providing an automated guided vehicle with a wire guidance apparatus which comprises a crossed coil sensor that includes two pairs of coils which are mounted at right angles to each other. The lateral distance between the coils is selected to provide a steering correction error signal that corresponds to an appropriate ratio of heading error to displacement error to enable the vehicle to both acquire the wire at angles of up to 45° degrees and track along curves in the wire with high accuracy. Furthermore, the leading coils are spaced closer together than the trailing coils because the polarity of the steering error signal is the same for heading and displacement errors. Thus, the present invention also preferably includes a second crossed coil sensor oriented 180 degrees from the first crossed coil sensor to enable the vehicle to acquire the wire and track around curves while travelling in the reverse direction. The wire guidance apparatus also comprises two additional sensors, each of which includes a pair of coils, mounted along the vehicle centerline at opposite ends of the vehicle. The spacing of the coils in each of these sensors is minimized to increase the accuracy of the vehicle when tracking along a straight run of wire at high speeds. In addition, the coils in each of the sensors of the present invention are spaced close together to minimize the affects of floor anomalies. The wire guidance apparatus of the present invention also comprises circuitry for switching between the sensors depending upon the direction of travel of the vehicle and whether the vehicle is tracking along a straight or curved wire.

These and other objects and advantages of the present invention will be made more apparent from the following detailed description, with reference to the accompanying drawings.

BRIEF DESCRIPTION OF THE DRAWINGS

FIG. 1 is a plan view illustrating the layout of the sensors in a preferred embodiment of the present invention;

FIG. 2 is a schematic representation of the crossed coil sensor of the present invention;

FIG. 2A is an electrical representation of the crossed coil sensor depicted in FIG. 1;

FIG. 3 is an electrical schematic diagram illustrating the preferred construction of the crossed coil sensor depicted in FIG. 2;

FIGS. 4A through 4D are schematic representations of the crossed coil sensor of FIG. 2, shown in relation to a straight guide wire;

FIG. 5 is an electrical schematic diagram illustrating a first portion of the circuitry of the present invention; and FIG. 6 is an electrical schematic diagram illustrating a second portion of the circuitry of the present invention.

DETAILED DESCRIPTION OF THE PREFERRED EMBODIMENTS

Referring to FIG. 1, the preferred layout of the sensors of the present invention is shown with reference to a representation of an automated guided vehicle 10 having a steerable wheel 12 at the front end of the vehicle and two non-steerable wheels 14 at the rear end of the vehicle. It is to be understood that the vehicle depicted in FIG. 1 is representative only, and that the present invention can be used with any configuration of automated guided vehicle. The wire guidance apparatus of the present invention comprises a first crossed coil sensor 16 located at the rear of vehicle 10 and two additional sensors 18 and 20 located at the front and rear, respectively, of vehicle 10. The preferred embodiment of the invention also comprises a second crossed coil sensor 22, the purpose of which will be described hereafter. Sensors 16 through 22 are mounted to vehicle 10 by any appropriate means and are aligned with the centerline of vehicle 10. The sensors allow vehicle 10 to acquire a guide wire embedded in the floor and track along both straight and curved portions of the guide wire with great accuracy to maintain the travel of vehicle 10 along a predetermined path.

Cross coil sensor 16 is designed to generate an appropriate ratio of heading angle error to lateral displacement error to enable vehicle 10 to both acquire the wire at relatively large angles and track along curves in the wire. Referring to FIGS. 2 and 2A, cross coil sensor 16 is shown to comprises two sets of coils mounted at right angles to each other. One set comprises coils L1 and L2 and the other set comprises coils L3 and L4. The coils in each set are connected in phase opposing relationship so that, when the wire is between the coils in each set, the voltages induced in the coils will be in phase. Also, noise induced in sensor 16 will cancel out when the individual voltages are summed together to produce the steering correction error signal. Coils L1 through L4 are preferably constructed of Ferrite core solenoids, which are less sensitive to floor anomalies, such as reinforcing bars, than other types of coils. In addition, coils L1 through L4 are located relatively close together so that any floor anomalies will tend to affect the coils equally.

Referring to FIG. 3, the voltages induced in coils L1 and L2 are applied to an inverting amplifier 24 having an adjustable gain. The output of amplifier 24 is applied through a coupling capacitor 26 to a differential amplifier 28, the output signal A of which is proportional to the voltages induced in coils L1 and L2. The signals from coils L3 and L4 are processed by similar circuitry, which produces an output signal B proportional to the voltages induced in coils L3 and L4. As will be described more fully below, the steering correction error signal generated by sensor 16 is the difference between signals A and B.

As mentioned previously, it is important that the steering correction error signal be more responsive to heading angle errors than lateral displacement errors. In the present invention, the ratio of heading angle error to lateral displacement error is determined by the relationship of the distance between coils L1 and L3 to the distance between coils L2 and L4. As is apparent from FIGS. 2 and 2A, coils L1 and L3 are laterally spaced closer together than coils L2 and L4. Referring to FIG. 4A, when sensor 16 is directly over a guide wire W, the voltages induced in each coil set are approximately 0.707 v. Therefore the error signal generated by sensor 16, the difference between signals A and B, is zero. In FIG. 4B, sensor 16 is laterally aligned over wire W, but at an angle of approximately 20 degrees. In this example, the voltage induced in coils L1 and L2 decreases to 0.422 v and the voltage induced in coils L3 and L4 increases to 0.906 v. The resulting difference, which represents the 20 degree heading angle error signal, is 0.484 v. In FIG. 4C, Sensor 16 is laterally displaced from wire W, but at a zero degree heading angle error. In this example, the voltage induced in coil L3 has increased more than the voltage induced in coil L4 has decreased from the previous example. Similarly, the voltage induced in coil L1 has decreased more than the voltage induced in coil L2 has increased. Thus, it is evident that heading errors affect sensor 16 more than displacement errors. Preferably, coils L1 and L3 are spaced approximately one and one quarter inches apart and coils L2 and L4 are spaced approximately two and one half inches apart.

FIG. 4D illustrates why the distance between coils L1 and L3 and coils L2 and L4 cannot be equal. In this example, the voltage induced in each coil set is equal, resulting in no error signal, despite the fact that there is an apparent lateral displacement error. Thus, the spacing between the coils cannot be equal. In addition, the leading coils L1 and L3 are selected to be closer together than the trailing coils because the polarity of the steering error is the same for both heading angle and lateral displacement errors. Thus, to track in both the forward and reverse directions requires the second crossed coil sensor 22.

The wire guidance apparatus of the present invention also comprises sensors 18 and 20, which are utilized for tracking along straight runs of wire W. Referring to FIG. 5, sensors 18 and 20 each comprise a single pair of coils L and R similar to coils L1 through L4. Each sensor 18 and 20 measures only the lateral displacement of that sensor to wire W. In a manner similar to that described in the aforementioned Taylor patent, the sum of the voltages induced in sensors 18 and 20 by wire W corresponds to the lateral displacement error and the difference of the voltages induced in sensors 18 and 20 corresponds to the heading angle error. A steering correction error signal that corresponds to the desired ratio of heading angle error to lateral displacement error is then generated electronically. Unlike Taylor, however, coils L and R in each of sensors 18 and 20 are spaced relatively close together, preferably approximately three inches, in order to reduce the affects of floor anomalies on each sensor. In addition, placing coils 18 and 20 at opposite ends of vehicle 10 increases the accuracy of the wire guidance apparatus. As a result, vehicle 10 is able to track very accurately along a straight run of wire W at high speeds.

Still referring to FIG. 5, the output signals from sensor 16 are fed into the circuitry of the present invention through a relay 30, which responds to a Reverse Travel signal from a vehicle controller (not shown) to instead pass along the output signals from sensor 22 when vehicle 10 is travelling in reverse. A relay 32, energized by a Radius/Acquire Antenna Select signal, couples the output signals A and B into filters 34 and 36, which are tuned to the frequency of the guide wire vehicle 10 is to follow. The outputs of filters 34 and 36 are fed to a (−)

envelope detector 38 and a (+) envelope detector 40, respectively. Envelope detectors 38 and 40 each output a DC voltage which is proportional to the amplitude of the signal from the corresponding filter 34 and 36. The output signals from envelope detectors 38 and 40 are applied to a summing amplifier 42, where they are summed to produce the steering correction error signal. A relay 44 is normally open when either sensor 16 or 22 is in use so that no error signal from the front sensor 18 is introduced. After passing through amplifier 42, the steering correction error signal is passed through another summing amplifier 46.

Referring to FIG. 6, a servo control circuit for controlling the steering of steerable wheel 12 is described. A relay 48, energized by the Radius/Acquire Antenna Select signal, passes the steering correction error signal on to a summing amplifier 50. Relay 48 selects the high gain necessary for acquiring the wire and tracking curves. For example, when approaching the wire at 45 degrees, the steering error for the steerable wheel has to be 90 degrees to keep sensor 16 over the wire. As the steering correction error signal passes through amplifier 50, the error signals from sensors 18 or 20 are isolated from amplifier 50 by a relay 52, which remains open in response to the Radius/Acquire Antenna Select signal. The signal from amplifier 50 is fed into a servo loop control circuit, which will now be described. The signal is applied to another summing amplifier 54, which sums the steering correction error signal with respective signals from a steer position potentiometer 56 and a tachometer 58. The output of amplifier 54 represents the guidance error signal, and this signal is combined with the output from a triangle wave generator 57 in a Pulse Width Modulated circuit, or PWM generator, 59. The outputs from PWM generator 59 are applied through drivers 60 to a proportional solenoid 62, which generates a hydraulic output that activates a hydraulic motor 64 connected to the steerable wheel 12 of vehicle 10. Solenoid 62 will continue to activate motor 64 until the output from the steer position potentiometer 56 is equal and opposite to the guidance error at amplifier 54. Tachometer 58 provides a differential input to the servo loop control circuit for purposes of increasing the stability of the system. The system just described will quickly straighten vehicle 10 over the wire. This is necessary when initially acquiring the wire or re-acquiring the wire after completing a radius turn.

Once vehicle 10 is over a straight run of wire, the wire guidance apparatus of the present invention will switch to sensors 18 and 20 for straight wire guidance. Referring again to FIG. 5, when the Radius/Acquire Antenna Select signal is turned off, relay 32 switches to pass along the signal from rear sensor 20 rather than the signal from either sensor 16 or sensor 22. The output signals from coils R and L of front sensor 18 are fed to respective filters 66 and 68 and envelope detectors 70 and 72 and are summed together in a summing amplifier 74. The output of amplifier 74 represents the lateral displacement of sensor 18 from the wire. The outputs from envelope detectors 70 and 72 are also applied to a differential amplifier 76, the output of which is used as an indication that sensor 18 is over the wire, the purpose of which will be described. In a similar manner, the output signals from coils R and L of rear sensor 20 are fed to respective filters 34 and 36 and envelope detectors 38 and 40 and are summed in amplifier 42. The output of amplifier 42 represents the lateral displacement of sensor 20 from the wire. The outputs from envelope detectors 38 and 40 are also applied to a differential amplifier 78, the output of which is used as an indication that rear sensor 20 is over the wire. The outputs from amplifiers 76 and 78 signal a vehicle controller that both sensors 18 and 20 are over the wire and, thus, that vehicle 10 is positioned along a straight run of wire. In response, the controller deactivates the Radius-/Acquire Antenna Select signal, which is applied to relays 32, 44, 48 and 52, so that the wire guidance apparatus of the present invention can switch from acquire/-radius tracking to straight wire tracking. When relay 44 is closed, the signals from sensor 18 are summed together with the signals from sensor 20 by amplifier 46 to produce a lateral displacement error signal that is representative of the lateral displacement of the centerline of the vehicle at the midpoint between sensors 18 and 20. The signals from sensors 18 and 20 are also applied through a relay 80 to a differential amplifier 82, which takes the difference of the signals to produce a heading angle error signal. The heading angle error is dependent upon the direction vehicle 10 is travelling. If, e.g., the embodiment of vehicle 10 depicted in FIG. 1 is moving forward and has a clockwise heading error, the heading angle error signal must indicate a counter-clockwise correction is needed. When vehicle 10 is travelling in reverse, the same clockwise error would require a clockwise correction. Relay 80, which is activated by the Reverse Travel signal, accomplishes the correction required for changing direction.

Referring again to FIG. 6, the heading angle error signal and the lateral displacement error signal are summed together in amplifier 50, the output of which is applied to amplifier 54. The output of amplifier 54 is the guidance error signal which is processed by the servo loop control described previously to generate the hydraulic output which activates motor 64.

The wire guidance apparatus of the present invention also preferably comprises a speed control or comparator circuit 84 that compares the amplitudes of the heading angle error and the lateral displacement error to preselected voltages. For heading angle error, these preset voltages correspond to a 1 degree or a 1.5 degrees error. For lateral displacement error, the preset voltages correspond to a 0.5 or a 1 inch error. The respective signals are applied to OR gates, which produce a "slow" command when the heading angle error is greater than 1 degree or the lateral displacement error is greater than 0.5 inch and a "stop" command when the heading error is greater than 1.5 degrees or the lateral displacement error is greater than 1 inch. The "slow" or "stop" commands signal a vehicle speed controller 86, which will either slow the speed of vehicle 10 or stop vehicle 10, as required, to ensure the safe operation of vehicle 10.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In an automated guided vehicle comprising a wire guidance apparatus for guiding the vehicle along a wire embedded in a floor, the wire being operable to generate a magnetic field and the vehicle comprising at least one steerable wheel and means responsive to a guidance error signal for turning the wheel, the improvement comprising:

a first sensor means for tracking along the wire when the vehicle is traveling in the forward direction;

the first sensor means comprising two overlapping pairs of coils, each pair being oriented at an angle to the other and operable to generate an output signal in response to the magnetic field;

means for combining and processing the output signals to produce a steering correction error signal indicative of the angle and the lateral displacement of the sensor means from the wire; and means for generating the guidance error signal from the steering correction error signal.

2. The improvement of claim 1, further comprising a second sensor means similar to the first sensor means for tracking along the wire when the vehicle is traveling in the reverse direction.

3. The improvement of claim 2, further comprising means for switching between the first sensor means and the second sensor means depending on the direction of travel of the vehicle.

4. The improvement of claim 1, further comprising means for generating a heading angle error and a lateral displacement error to enable the vehicle to track along a straight section of the wire.

5. The improvement of claim 4, wherein the means comprises a third sensor means responsive to the magnetic field for generating an output signal representative of the lateral displacement of the third sensor means from the wire, a fourth sensor means responsive to the magnetic field for generating an output signal representative of the lateral displacement of the fourth sensor means from the wire, means for combining the outputs of the third and fourth sensor means to produce a heading angle error signal, means for combining the outputs of the third and fourth sensor means to produce a lateral displacement error signal, and means for combining the heading angle error and lateral displacement error signals to produce the guidance error signal.

6. The improvement of claim 5, further comprising means for automatically switching between the first sensor means and the third and fourth sensor means.

7. The improvement of claim 1, wherein the pairs of coils are mounted at right angles to each other and define two leading coils and two trailing coils, wherein the two leading coils are spaced closer together than the two trailing coils.

8. An apparatus for guiding a vehicle along a wire embedded in a floor, the wire being operable to generate a magnetic field, which comprises:

a first sensor means comprising two overlapping pairs of coils, the pairs of coils being mounted at right angles to each other and defining two leading coils and two trailing coils, the two leading coils being spaced closer together than the two trailing coils, each pair being responsive to the magnetic field to generate an output signal;

means for combining and processing the output signals to produce a steering correction error signal indicative of the angle and the lateral displacement of the sensor means from the wire;

means responsive to the steering correction error signal for controlling the direction of travel of the vehicle.

* * * * *